United States Patent [19]
Kidd

[11] 3,716,973
[45] Feb. 20, 1973

[54] MACHINES FOR CUTTING CROPS

[75] Inventor: Archibald W. Kidd, Melksham, England

[73] Assignee: Archie Kidd (Designs) Limited, Roundway, Devizes, Wiltshire, England

[22] Filed: July 13, 1970

[21] Appl. No.: 54,202

[30] Foreign Application Priority Data

July 16, 1969 Great Britain...................35,703/69

[52] U.S. Cl. .............................56/6, 56/192, 56/295, 56/371, 56/372, 56/503
[51] Int. Cl. ............................................A01d 43/04
[58] Field of Search....56/6, 192, 255, 295, 371, 372, 56/503

[56] References Cited

UNITED STATES PATENTS

| | | | |
|---|---|---|---|
| 982,686 | 1/1911 | Milstead | 56/371 |
| 3,115,741 | 12/1963 | Robinson | 56/503 |
| 3,501,901 | 3/1970 | Van Der Lely | 56/6 |
| 3,550,360 | 12/1970 | Van Der Lely | 56/295 X |
| 2,963,844 | 12/1960 | Engler | 56/295 |
| 2,918,774 | 12/1959 | McCarty | 56/1 |

FOREIGN PATENTS OR APPLICATIONS

| | | | |
|---|---|---|---|
| 1,520,474 | 4/1968 | France | 56/192 |
| 973,945 | 11/1964 | Great Britain | 56/6 |
| 772,399 | 10/1934 | France | 56/371 |
| 444,559 | 2/1968 | Switzerland | 56/6 |
| 264,891 | 9/1968 | Austria | 56/192 |
| 11,989 | 6/1908 | Great Britain | 56/371 |

*Primary Examiner*—Russell R. Kinsey
*Assistant Examiner*—J. A. Oliff
*Attorney*—Jacobs & Jacobs

[57] ABSTRACT

Machine for cutting crops by cutters pivotally mounted on a pair of drums mounted on vertical axes and rotating in opposite directions, the cut crop being swept backwards between the drums to a tedder mounted behind the drums. The tedder forms the cut crop into a light fluffy swath.

11 Claims, 12 Drawing Figures

PATENTED FEB 20 1973

INVENTOR
ARCHIBALD WATSON KIDD
By
Jacobs & Jacobs

PATENTED FEB 20 1973
3,716,973
SHEET 2 OF 3
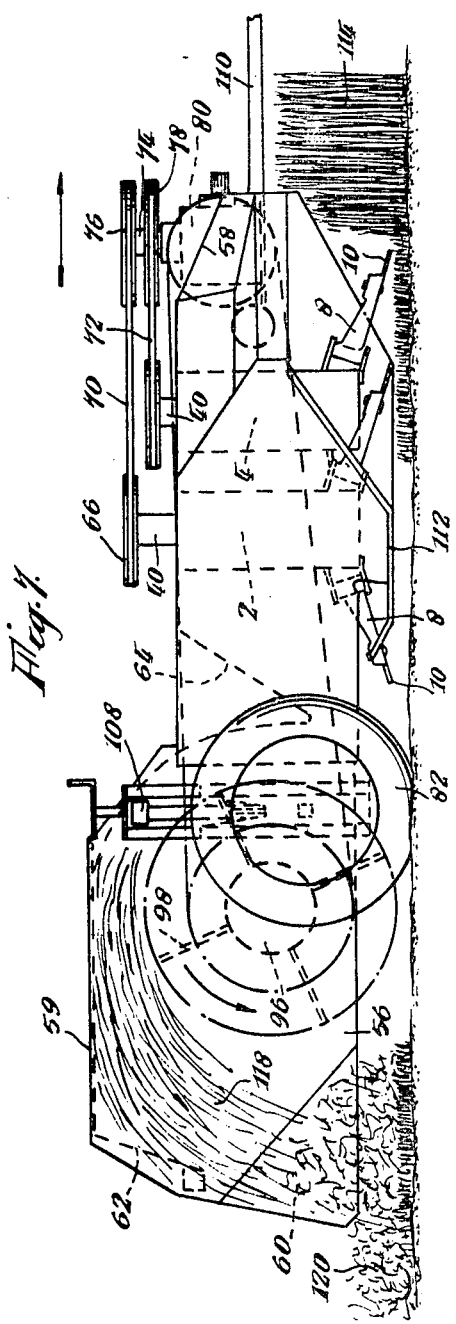
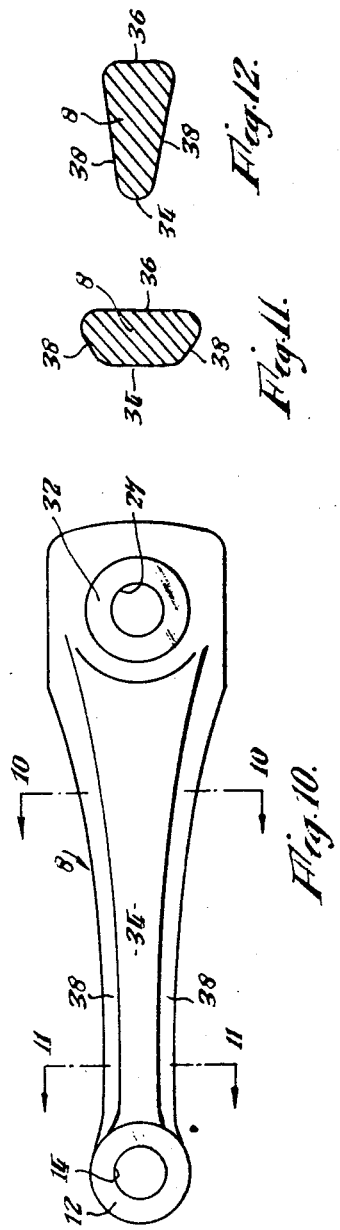
INVENTOR
ARCHIBALD WATSON KIDD
By Jacobs & Jacobs

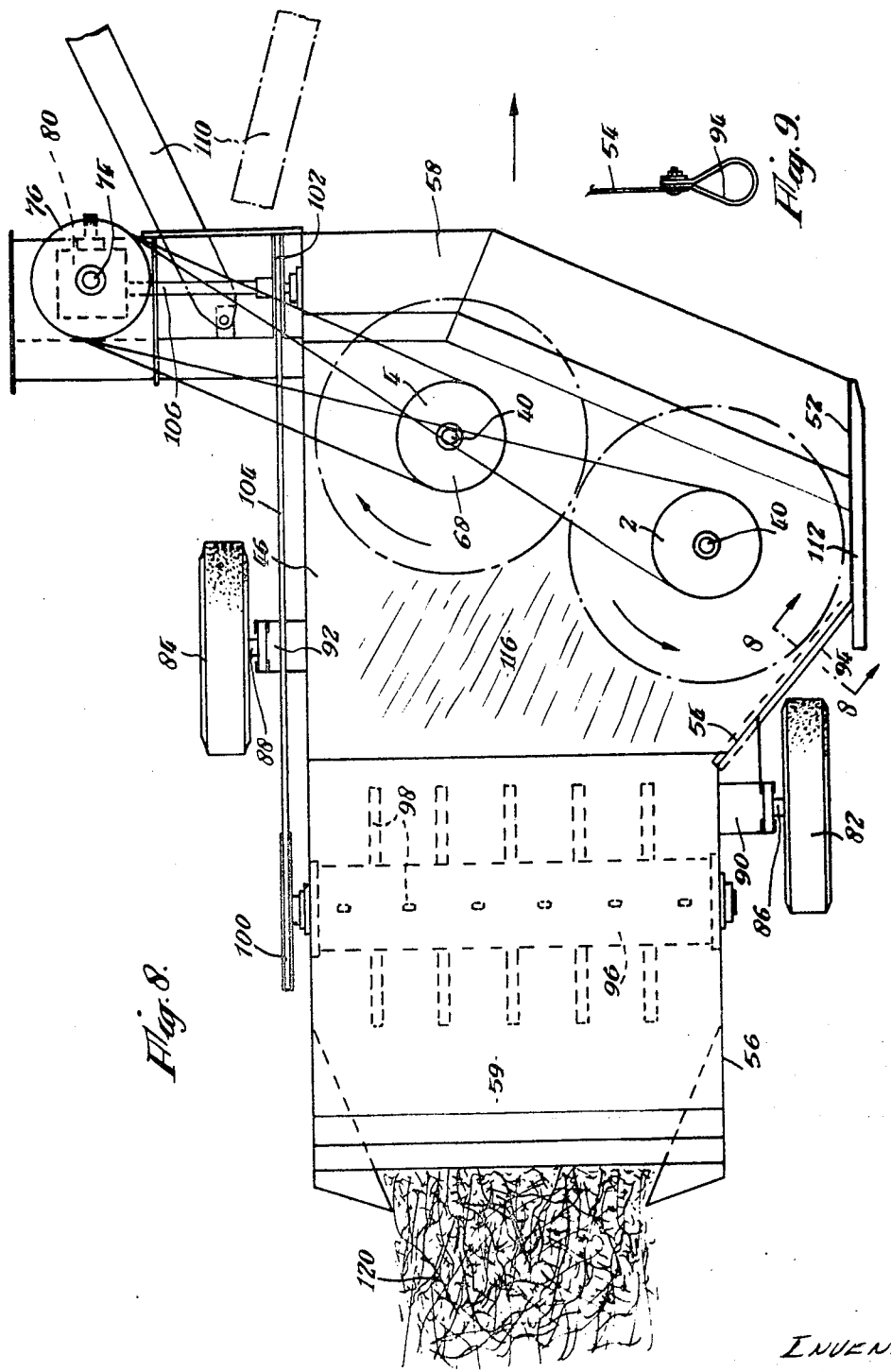

MACHINES FOR CUTTING CROPS

Existing mowing machines, particularly of the drum or disc type which are used in Agriculture for cutting grass for making wilted silage or grass for making into hay and suchlike suffer from the disadvantage that they leave a very dense swath in which the leafy and stem material of the crop is tightly packed together in a substantially parallel dense formation which prevents rapid drying since the sun and air cannot easily penetrate. Thus swaths of crop cut with these machines have to be tedded after cutting so as to shake them out more loosely if a reasonable rapid rate of drying or wilting is to be obtained.

This invention has for its object to provide crop cutting machine in which the cutting mechanism is of the drum type with means being provided for forming the cut crop into a loose fluffy swath thus avoiding the need to go over the field separately subsequent to the original cutting.

According to one aspect of this invention there is provided a machine for cutting crops comprising two drums both rotatable on vertical axes in opposite directions and each bearing cutters, the cut crop being swept inwards and backwards between the two drums, and a tedder mounted behind said drums. Preferably one drum is mounted in advance of the other and both drums being mounted on the top panel of a casing enclosing the machine.

According to a second aspect of this invention there is provided a drum unit for mounting on a vertical axis of a crop cutting machine said drum having at its lower end portion a plurality of downwardly and outwardly extending cutters pivoted on the drum capable of swinging backwards and upwards, there being an uninterrupted space between the bottom of the drum and a plane drawn through the lower ends of the cutters.

Some further features of one form of machine made according to this invention and the advantages to be derived therefrom will now be described.

The machine broadly comprises at least one pair of vertical cutting drums — each pair contra-rotating in such a way that as the machine travels forward into the standing crop the cut material is swept inwards and backwards through in between the two drums. The drums, which have substantially vertical axes each carry near their bottom periphery the requisite number (e.g. two to six) radial cutters, extending downwards and outwards and pivoted so as to swing backwards and upwards. The cutters themselves differ from those of already known type in that the actual cutters which impinge on the crop consist of separate cutting blades secured in flail carriers or holders of relatively substantial design. By having these holders made of, for instance, forged steel and of substantial weight (for instance 4 – 5 lbs each) several advantages accrue. Firstly the actual cutting blade can be slotted into the holder in such a way as to be substantially protected from damage from stones and obstructions while at the same time the cutter can be made reversible by changing from one drum to the other thus securing the use of two cutting edges before the cutting blade needs to be replaced.

Furthermore by making the flails or blade carriers of substantial length, say 5 inches – 12 inches for example, and by pivoting them to the vertical rotor drums on an inclined axis so that the radially extended portion of the flail not only projects outwards from the skirt of the drum but also downwards, the advantage then arises of having a cutter which when striking a stone or similar object will not only swing backwards out of the way but also upwards. This upward movement may be made to be quite substantial such as, 3, 4 or even 5 inches, so that there is then no need to provide the bottom of the cutting drums or cylinders with special dished or mushroom-shaped bottom covers or discs (frequently used to enable similar cutting drums to ride up over stones) as the ground clearance at the bottom of the drum is already sufficient to pass over any stones likely to be met with without the need for such devices.

A further advantage of having substantial and relatively long and heavy cutting flails carrying replaceable cutters at their outward tips is that a lower drum speed can be employed than would be the case if short light cutters were used. Such short light cutters have insufficient stiffness arising from centrifugal force to sweep through a tough crop without more or less seriously deflecting backwards on their pivots. Consequently to overcome this defect higher rotational speeds have to be employed which give rise to other problems in farm machinery and the heavier slower rotating cutters described above are, therefore, greatly to be preferred.

A very important advantage arising from long downwardly-inclined flails or cutters which swing backwards and upwards out of the way on impinging against a stone is that the great height clearance they give rise to when the cutter has swung right back means that a relatively heavy and substantial cutting drum arrangement can be used, supported from the casing of a trailed machine. This is in contra-distinction to the light tackle which has to be employed when the cutting cylinders are mounted on a suspending frame carried on the tractor rear linkage. In such cases it is not possible to use heavy duty construction as the sideways turning movement on the tractor linkage would be too great for practical purposes. Additionally by having the vertical cutting drums mounted in the case of a trailed machine, the possibility of doing without guards or mushroom-shaped bottom covers for the drums becomes a practical proposition since the casing of the machine can be carried on suitably positioned wheels and can also be provided with skids so that the cutting cylinders are held at a fairly regular and adjustable height above the ground. In the case of an array of cutting cylinders held on a light framework and structure sideways out from a tractor suspended from the rear of the tractor or from the linkage thereof some form of round-bottoming provision has to be given to the base of the cutting drums to prevent the cutters being forced into the ground if the tractor lurches slightly owing to the ground being only imperfectly level. In other words the long upwardly swinging flail immediately in itself gives rise to the possibility of substantial drums mounted in a casing drawn as a separate trailed implement.

Some drum-type mowers have the pairs of cylinders synchronized together so that the cutters will not clash although overlapping. A known alternative which avoids the need of synchronizing the drums is to stagger one drum of each pair slightly behind the other so that the necessary overlap is achieved to prevent a small strip of crop between the two cutting drums remaining uncut. I now propose to use this staggered arrangement of the drums to advantage in a way which has not been done before. The cut crop tends to pass through between the pairs of cutting drums in a parallel dense fore-and-aft laminated form in which the fore-and-aft direction of the blades and stems of grass or crop is in a direction substantially perpendicular to a line connecting the axes of the two drums. By having the drums staggered the center line of the two drums is now say some 10° – 20° away from a line truly transverse to the direction of travel and it will be seen that the grass leaf and stem in the swath is also deflected from a true fore-and-aft direction of lay by a similar angle. If one imagines a swath in the plan view the blades and stems of grass will be lying in a kind of cross-hatched formation. If now we mount behind the drums a transverse horizontal axis tedding reel, whether this spring, swinging, fixed or flexible tines and whether rotating in such a way as to ted by a back-kicking action or an up-and-over action - it will be seen that such a tedder will have a much better chance of tearing the swath apart blade by blade and stem by stem than would have been the case if the grass has been lying in a truly fore-and-aft formation. In the latter case it is well known that a swath can pass through a crimper or tedder without being adequately shaken up and spread apart so as to loosen it. The angled lay of the grass in the swath however gives the tedding tines a much better chance of picking off the crop piece by piece and strewing it loosely behind in a much more effective manner. To complete the tedding part of the machine it may be advantageous to sweep the grass up from the tedder into the roof or upper part of the casing containing the tedding reel and the cutting drums and the casing may be shaped in such a way as further to spread out the grass before it is allowed to drop lightly on to the ground in the form of a loose fluffy swath. It may be found advantageous slightly to angle the axis of the tedding reel so as to increase the angle of attack of the tedding tines on the blades of grass and thus further facilitate blade by blade treatment as it were.

One specific form of machine for cutting and tedder crops made according to this invention is illustrated in the accompanying drawings wherein:

FIG. 7 is a side elevation of the machine in use.

FIG. 8 is a plan view of the machine shown in FIG. 7.

FIG. 9 is a section taken on line 8—8 of FIG. 8.

FIG. 10 is a plan view of FIG. 2, and

FIGS. 11 and 12 are sections taken on lines 11—11 and 12—12 respectively on FIG. 10.

Figure 1:
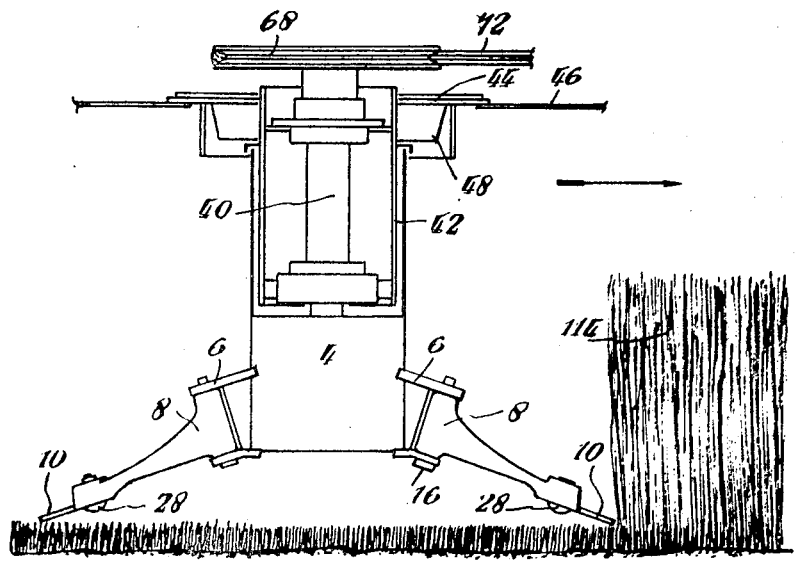
FIG. 1 is a side elevation of one drum.
Figures 2, 3, 4, 5, 6:
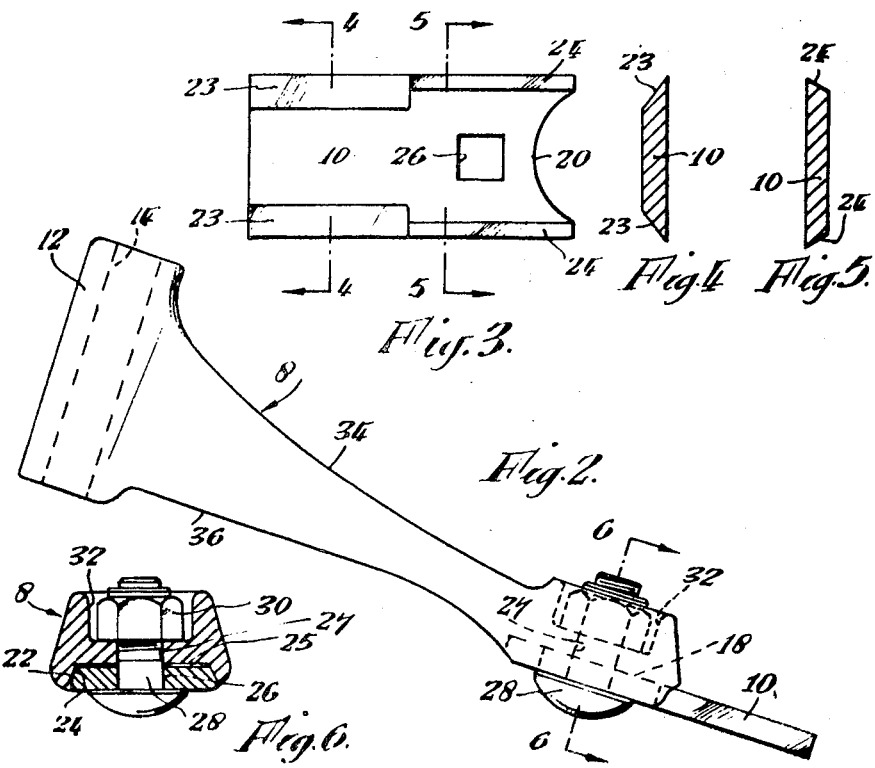
FIG. 2 is a side elevation of one cutter shown to an enlarged scale.
FIG. 3 is a plan of one blade.
FIG. 4 is a section taken through line 4—4 of FIG. 3.
FIG. 5 is a section taken through line 5—5 of FIG. 3.
FIG. 6 is a section taken on 6—6 of FIG. 2.

Referring to the drawings, the machine comprises two rotatable drums 2 and 4 mounted on vertical axes and each provided at its lower end portion with three cutters pivotally mounted on brackets 6 so that each cutter extends downwards and outwards from the drum and is capable of swinging backwards and upwards. The lower edge of the drum is 5 inches from the ground and the drums are relatively positioned one in advance of the other so that the cutters cannot foul each other. The cutters each comprise an arm or holder 8 and a removable cutting blade 10. The holder 8 is of substantial construction and extends from a boss 12 bored at 14 to receive a pivot pin 16 for holding it in the bracket 6. In the particular construction shown the brackets 6 are arranged at an angle of 20° to the vertical. The undersurface of the outer end portion of the holder 8 is slotted at 18 to receive the cutting blade 10 which is arcuately shaped at its inner end 20 so as to engage with a complementarily shaped end of the slot 18. The opposite side faces 22 of the slot 18 are tapered outwards and downwards. The end 20 may be differently shaped if desired. The blade 10 is tapered at each side to provide a pair of cutting edges 23 at the front part and is less sharply tapered at the rear part to provide faces 24 which seat on the side faces 22 of the slot 18 and leave a clearance 25 at the bottom of the slot 18, and the blade 10 is further provided with a square or other aperture 26. A bolt 28 passes through the aperture 26 and through an aperture 27 in the holder 8 and engages a nut 30 located in a recess 32 in the upper face of the holder which recess 32 wholly shrouds the nut to protect it. In this manner the blade 10 is removably secured in the cutter 8. The shape of the holder 8 is best seen in FIGS. 2, 6 and 10 – 12. The holder 8 is shaped to give maximum lateral strength towards the outer end and maximum vertical strength towards the inner or pivoted end 12. The upper face 34 is narrower than the lower face 36 and the side faces 38 are inclined upwards and backwards away from the vertical. The purpose of this being to provide that the leading face 38 of the holder acts as a crop deflector or conveyor to carry the crop arcuately between the drums 2 and 4.

Each drum 2 and 4 is driven by a vertical shaft 40 mounted in suitable bearings in a cylindrical casing 42 provided inside the upper portion of the drum, the upper end of the casing 42 being provided with a flange 44 for removably fixing the drum unit to the top panel 46 of the machine casing. A labyrinth or grass ring generally indicated at 48 is also provided to prevent ingress of grass and dirt to the interior of the drum bearings.

Referring now to FIGS. 7 and 8 which shows the general arrangement of the machine. The machine casing which encloses the two drums 2 and 4 with their cutters 8 and the tedder reel described in detail later comprises a forward flat top panel 46 on which the drums 2 and 4 are mounted, said panel 46 being of unsymmetric design as shown in FIG. 8. one side panel 50 of the casing is straight and extends the full length of the machine and provides one side of the tedder chamber behind the drums. The opposite side of the casing comprises a forward panel 52 parallel to the panel 50, and a rearwardly inclined panel 54 and a rear panel 56 forming the opposite side of the tedder chamber. The front 58 of the casing extends forwards and downwards from the top 46 providing a protection for the operator from flying stones etc. The back portion 59 of the top of the casing is elevated to accommodate the tedder and the back of the casing has a pair of inwardly directed wings 60 to control the width of the swath. Inside the casing there is a deflector baffle 62 behind the tedder and below the top of it and set at an angle of 20° to the vertical to deflect tedded crop into a swath. Between the cutting chamber and the tedding chamber there is a baffle 64 to prevent the cut crop from being thrown back into cutters. The two drums 2 and 4 are driven through pulleys 66 and 68, and belts 70 and 72 respectively, from a common shaft 74 through twin pulleys 76 and 78 arranged one above the other. The shaft 74 is driven from the power take off of the tractor with the normal universal joints to be gearbox 80.

In such a machine it is advisable to keep the ground wheels as close to the cutting point as possible so as to enable the machine better to follow rough or undulating ground without the cutters digging in. Accordingly, one of the wheels 82 is tucked in behind the rear cutting drum 2 and the other wheel 84 is brought forward as far as possible so that a line drawn between the ground contact points of the two wheels 82 and 84 will be as close up behind as possible a line drawn between the axes of the cutting drums 2 and 4. The wheels 82 and 84 are mounted on stub axles 86 and 88 respectively borne by brackets 90 and 92 projecting from casing. In order to ensure that stones and other field obstructions do not come into the path of the wheel 82 a resilient buffer 94 is provided at the lower edge of the side plate 54. This takes the form of a strip of rubber like material formed into a loop and secured to the plate 54.

The tedder which is offset from the center line of cut between the drums 2 and 4 comprises a horizontal drum 96 set at right angles to the direction of travel and having a plurality of tines 98. The drum 96 is mounted between the side panels 50 and 56 of the casing and driven through pulleys 100, 102 and belt 104 by the horizontal driven shaft 106 which takes its power from the power take off.

The machine is provided with height control either by means of screw jacks one of which is shown at 108 in FIG. 7 or hydraulic rams or a combination of both, or by a mechanical linkage arrangement acting on the ground wheels. The machine is also fitted with a towing draw-bar 110 enabling the machine to be transferred from the towing position to the fully offset cutting position shown in full lines in FIG. 8. The draw bar 110 is shown in chain dotted lines in the towing position. The casing is also provided with skids 112.

In use, the machine drawn by a tractor cuts the standing grass which is indicated at 114 in FIG. 7. The cut crop passes between the two drums 2 and 4 and is thrown to the back of the cutting chamber in the direction indicated at 116 assisted by the shape of the cutter holders 8, and the baffle 64 preventing the crop from falling back onto the cutters. The tines 98 of the tedder pick up the crop and progressively attack the swath of crop and to some extent tear it apart or open it out instead of dealing with it in the mass. The crop can be seen at 118 in FIG. 7 from whence it is delivered from the back of the casing in a light fluffy swath 120.

When cutting a field of grass or other crop with a machine as described above and travelling in a clockwise direction around the area it is not necessary to make a left hand diversion at the corners of the field because the wheel 82 acts as a pivot remaining stationary, as the tractor makes a sharp right turn at the corner.

As an alternative to a fully trailed machine it is possible to arrange the machine as a semi-mounted unit from the tractor linkage providing there is an outrigger wheel to control the height from the ground.

Instead of driving the drums 2 and 4 and tedder from the power take off, hydraulic drives may be employed.

Instead of the drums 2 and 4 being mounted one in advance of the other, they can be arranged side by side and geared so as to avoid the cutters fouling each other. In this case the axis of the tedder instead of being transverse to the direction of travel is inclined to a line joining the axes of the drums 2 and 4 so that the cut crop is thrown towards the longitudinal center line of the machine by the tedder.

I claim:

1. A machine for cutting crops comprising a moveable frame, a pair of drums disposed downwardly towards the ground and rotatably mounted solely from above on said frame for rotation about substantially parallel vertically extending axes, a plurality of elongated cutters pivotably mounted on the periphery of the bottom of the drums about downwardly and inwardly extending axes, said cutters being angularly disposed downwardly and outwardly with outboard end of each cutter terminating below the bottom of said drum, and means operable to rotate said drums in opposite directions whereby crop cut by said cutters is swept inwardly between said drums.

2. A machine for cutting crops comprising a moveable frame, a pair of drums disposed downwardly towards the ground and rotatably mounted solely from above on said frame for rotation about substantially parallel vertically extending axes, a plurality of elongated cutters pivotably mounted on the periphery of the bottom of the drums about downwardly and inwardly extending axes, said cutters being angularly disposed downwardly and outwardly with the outboard end of each cutter terminating below the bottom of said drum, means operable to rotate said drums in opposite directions whereby crop cut by said cutters is swept inwardly between said drums, and means for tedding crop swept between said drums, said tedding means being mounted behind said drums.

3. A machine according to claim 2 including baffle means disposed between said drums and said tedding means so operable to prevent cut crop from being thrown back into said drums and cutters.

4. A machine according to claim 2 wherein the axis of rotation of one of said drums is disposed forward of the axis of rotation of the other drum.

5. A machine according to claim 4 wherein said frame is mounted on wheels and comprises a substantial casing, said means for tedding crop swept between said drums being mounted in the frame behind said drums and offset, in relation to the center line of cut, to that side of the frame having the forwardly disposed drum.

6. A machine according to claim 5 wherein said wheels are disposed on said frame so that a line joining their axes of rotation is substantially parallel to a perpendicular line joining the axes of rotation of the drums.

7. A machine according to claim 6 adapted for towing, the point of attachment for towing being on the side of the frame to which the tedding means are disposed and the wheel on the other side being disposed between the rearwardly disposed drum and the axis of rotation of the tedding means.

8. A machine according to claim 2 wherein each of said cutters comprises a blade holder and a removable cutting blade rigidly secured thereto.

9. A machine according to claim 8 wherein the blade holder is tapered to provide relatively higher lateral strength at outer portion with relatively higher vertical strength at the inner portion with an inclined leading face, relative to the rotation of the drum, to deflect crop cut by the cutting blade arcuately backward between the drums.

10. A machine according to claim 2 wherein each of said cutters is pivotably mounted on brackets disposed about the periphery of the bottom of said drums for pivoting within a plane which is transverse to the axis of rotation of said drums.

11. A machine according to claim 10 wherein the axes of pivotable rotation of each cutter is about 20° from vertical.

* * * * *